US012434240B2

(12) United States Patent
Weber

(10) Patent No.: US 12,434,240 B2
(45) Date of Patent: Oct. 7, 2025

(54) FLOW CELL COMPRISING A STORAGE ZONE AND A DUCT THAT CAN BE OPENED AT A PREDETERMINED BREAKING POINT

(71) Applicant: THINXXS MICROTECHNOLOGY GMBH, Zweibrücken (DE)

(72) Inventor: Lutz Weber, Zweibrücken (DE)

(73) Assignee: THINXXS MICROTECHNOLOGY GMBH, Zweibrücken (DE)

( * ) Notice: Subject to any disclaimer, the term of this patent is extended or adjusted under 35 U.S.C. 154(b) by 33 days.

(21) Appl. No.: 18/187,560

(22) Filed: Mar. 21, 2023

(65) Prior Publication Data

US 2023/0219085 A1 Jul. 13, 2023

Related U.S. Application Data

(63) Continuation of application No. 16/203,039, filed on Nov. 28, 2018, now Pat. No. 11,642,673, which is a (Continued)

(30) Foreign Application Priority Data

Jul. 1, 2014 (EP) .................................... 14175207

(51) Int. Cl.
*B01L 3/00* (2006.01)

(52) U.S. Cl.
CPC ... *B01L 3/502738* (2013.01); *B01L 3/502707* (2013.01); *B01L 3/50273* (2013.01); (Continued)

(58) Field of Classification Search
CPC ......... B01L 3/502738; B01L 3/502707; B01L 3/50273; B01L 3/523; B01L 2200/027; (Continued)

(56) References Cited

U.S. PATENT DOCUMENTS 6,431,212 B1 * 8/2002 Hayenga ............ B01F 33/3011 417/322
9,005,546 B2 4/2015 Weber
(Continued)

FOREIGN PATENT DOCUMENTS

| | | | |
|---|---|---|---|
| DE | 102009009728 | A1 | 9/2010 |
| DE | 102011003856 | A1 | 8/2012 |
| EP | 2647435 | A1 | 10/2013 |
| EP | 2679307 | A1 | 1/2014 |
| WO | 2009071078 | A1 | 6/2009 |

*Primary Examiner* — Samuel P Siefke
(74) *Attorney, Agent, or Firm* — LUCAS & MERCANTI, LLP; Klaus P. Stoffel

(57) ABSTRACT

A flow cell having at least one storage zone connected to a duct for conducting fluid out of, into or/and through the storage zone. The duct includes a duct section which is delimited by a substrate and a film joined to the substrate and in which the duct is sealed and can be opened at a predetermined breaking point by deflecting the film. The film covers a recess in the substrate which forms the duct section. A sealing wall that seals the duct and is integrally joined to the substrate is placed in the recess. The predetermined breaking point is formed by a breakable joining region between the film and an edge portion of the sealing wall facing the film. The dimensions of a peripheral area of the sealing wall is formed in the edge portion and runs parallel to the film determine the surface area of the joining region.

7 Claims, 5 Drawing Sheets

Related U.S. Application Data continuation of application No. 15/322,751, filed as application No. PCT/EP2015/063992 on Jun. 22, 2015, now Pat. No. 10,173,215.

(52) U.S. Cl.
CPC ......... *B01L 3/523* (2013.01); *B01L 2200/027* (2013.01); *B01L 2200/028* (2013.01); *B01L 2200/0689* (2013.01); *B01L 2300/0816* (2013.01); *B01L 2300/0887* (2013.01); *B01L 2300/123* (2013.01); *B01L 2400/0481* (2013.01); *B01L 2400/0487* (2013.01); *B01L 2400/0655* (2013.01)

(58) Field of Classification Search
CPC ....... B01L 2200/028; B01L 2200/0689; B01L 2300/0816; B01L 2300/0887; B01L 2300/123; B01L 2400/0481; B01L 2400/0487; B01L 2400/0655; Y02E 60/50
See application file for complete search history.

(56) References Cited

U.S. PATENT DOCUMENTS

| | | | |
|---|---|---|---|
| 9,108,192 | B2 | 8/2015 | Weber |
| 9,149,802 | B2 | 10/2015 | Weber |
| 9,211,538 | B2 | 12/2015 | Weber |
| 9,309,879 | B2 | 4/2016 | Schmidt |
| 2011/0275058 | A1 | 11/2011 | Zhou |
| 2011/0303306 | A1 | 12/2011 | Weber |
| 2012/0214254 | A1 | 8/2012 | Schmidt |

* cited by examiner

FLOW CELL COMPRISING A STORAGE ZONE AND A DUCT THAT CAN BE OPENED AT A PREDETERMINED BREAKING POINT

CROSS-REFERENCE TO RELATED APPLICATIONS

The present application is a Continuation Application of U.S. patent application Ser. No. 16/203,039, filed Nov. 28, 2018, which is a Continuation Application of U.S. patent application Ser. No. 15/322,751, filed Dec. 29, 2016, issued Jan. 8, 2019 as U.S. Pat. No. 10,173,215, which is a 371 of International Application PCT/EP2015/063992 filed on Jun. 22, 2015 which claims the benefit of priority from European Patent Application No. 141 75 207.1 filed Jul. 1, 2014, the contents of each of which are incorporated herein by reference.

BACKGROUND OF THE INVENTION

The invention relates to a flow cell, in particular for analyzing or/and synthesizing substances, having at least one storage zone which is connected to a duct for transporting fluid from, into, or/and through the storage zone, wherein the duct has a duct zone that is delimited by a substrate and by a flexible film which is connected to the substrate, in which duct zone the duct is closed off and at a predetermined breaking point is openable while deflecting the film.

A flow cell of such type in which the duct is connected to a storage chamber that is to be emptied by way of the duct is derived from WO2009/071078 A1. The storage chamber is formed by a thermoformed zone of the otherwise planar film that delimits the duct zone. The film is composed of an aluminum layer having a plastics coating that faces the internal side of the storage chamber. Outside the storage chamber and the duct zone, and at the predetermined breaking point, the film is adhesively bonded or/and welded to a planar surface of the substrate or to a further film that covers the latter.

The predetermined breaking point that is established by welding or/and adhesive bonding between the plastics coating of the film and the planar surface of the substrate, in terms of the planar extent of the former, is capable of being metered only with great difficulty. Influences caused by variations result above all from the behavior of the plastics coating of the film during welding, from the distribution of the temperature generated by a welding tool, from the achievable welding track width of approx. 1 mm, from the accuracy in positioning the welding tool and thus from the reproducibility of the spacing of the predetermined breaking point from the storage zone. The force required for rupturing the predetermined breaking point varies accordingly in an undesirable manner.

SUMMARY OF THE INVENTION

The invention is based on providing a new flow cell of the type mentioned at the outset, having a duct zone that has a predetermined breaking point, wherein the force for rupturing the predetermined breaking point is in a tighter tolerance range.

This object is achieved according to the invention in that the film covers a clearance in the substrate that forms the duct zone, and a barrier wall which is integrally connected to the substrate and which shuts off the duct is disposed in the clearance, that the predetermined breaking point is formed by a rupturable connection zone between the film and a peripheral portion of the barrier wall that faces the film, and that the dimensions of a peripheral area of the barrier wall that is parallel with the film and is formed in the peripheral portion are relevant to the planar extent of the connection zone.

By way of concentrating the connection zone that forms the predetermined breaking point according to the invention to the peripheral area of the barrier wall that reaches up to the film, the connection zone, independently of the welding conditions, has a defined extent and position. Variations in the force required for rupturing the predetermined breaking point are accordingly minor.

As is explained below, the mentioned peripheral area may approximate a line that is perpendicular to the flow direction of the fluid.

Preferably, the duct is openable by way of a fluid pressure that bears on the predetermined breaking point, or by way of mechanical or/and pneumatic deflection of the film. While a fluid pressure may be built up e.g. by squeezing a storage chamber having a flexible film wall, an operating apparatus that is provided for the flow cell may be employed for mechanically or/and pneumatically rupturing the predetermined breaking point.

It is to be understood that the film at the peripheral portion may be adhesively bonded or/and welded to the peripheral area of the barrier wall. Alternatively or additionally, a releasable clamping connection could be established by way of a clamping element that acts on the film and is movably connected to the flow cell.

The barrier wall is preferably produced in one operational step, conjointly with the injection molding of the substrate.

In one particularly preferred embodiment of the invention, the peripheral area of the barrier wall terminates flush with the opening periphery of the clearance that is formed in the substrate. In this way it may be ensured that the barrier wall by way of the peripheral portion thereof that faces the covering film reaches up to the film, and that the film may be adhesively bonded or/and welded in one operational step to both the substrate as well as to the peripheral portion of the barrier wall.

While it is possible for the barrier wall to be configured so as to be annular, while blocking a corresponding radial fluid flow, the barrier wall in the preferred embodiment is configured as a barrier web that traverses the clearance in the substrate, said barrier web at the ends thereof being connected to the substrate.

The thickness of the barrier wall preferably decreases toward the covering film, in particular in such a manner that the film bears on the peripheral portion of the barrier wall in only a linear manner.

Accordingly, the barrier wall in the cross section may be configured so as to be triangular or segment-shaped. In one further embodiment, the peripheral portion of the barrier wall bears on the film by way of a flattening. The length of the flattening in the flow direction, and thus the length of the predetermined breaking point in this direction, is preferably less than 0.5 mm, in particular less than 0.1 mm, optionally less than 0.05 mm.

The clearance preferably opens toward a planar area of a preferably plate-shaped substrate, and the film that covers the clearance is preferably a planar film.

In one further embodiment of the invention, the duct, in that duct zone that has the predetermined breaking point, in relation to duct zones that are adjacent thereto, is widened or constricted in the cross section. The barrier web can be lengthened or shortened accordingly. Since the rupture force of the predetermined breaking point depends on the geometry of the connection zone between the film and the barrier web, the rupture force may be set by a suitable choice of the widening or the constriction. The rupture force exerted by a mechanical actuator that compresses the storage zone is preferably less than 20 N, in particular less than 10 N, optionally less than 5 N.

The predetermined breaking point in the case of a projection that is perpendicular to the plate plane of the substrate preferably lies in the projected zone of the storage chamber. In this space-saving embodiment the storage chamber is optionally located on one side of the plate-shaped substrate, while the clearance that forms the duct zone is disposed on the other side of the plate.

In particular in the case of the latter embodiment, the storage chamber may be composed of a film that has an aluminum layer having a plastics coating that faces the internal side of the storage chamber, wherein the plastics coating is applied in a planar manner to the substrate by welding or adhesive bonding, and the predetermined breaking point is formed between the plate-shaped substrate and a cover film from plastics, preferably from the same plastics as the substrate. Thermal welding, ultrasonic welding, or laser welding may be considered for producing the predetermined breaking point from identical plastics material, for example.

In a further design embodiment of the invention, the duct may have a plurality of predetermined breaking points, and a functional element of the flow cell, such as a drying reagent, for example, may in particular be disposed downstream of a predetermined breaking point.

Moreover, the drying reagent may be enclosed between two predetermined breaking points.

A film that delimits the storage chamber may be identical to a film that delimits the duct zone, in particular when the storage chamber and a duct zone that is connected to the storage chamber are both disposed on one side of a plate-shaped substrate.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
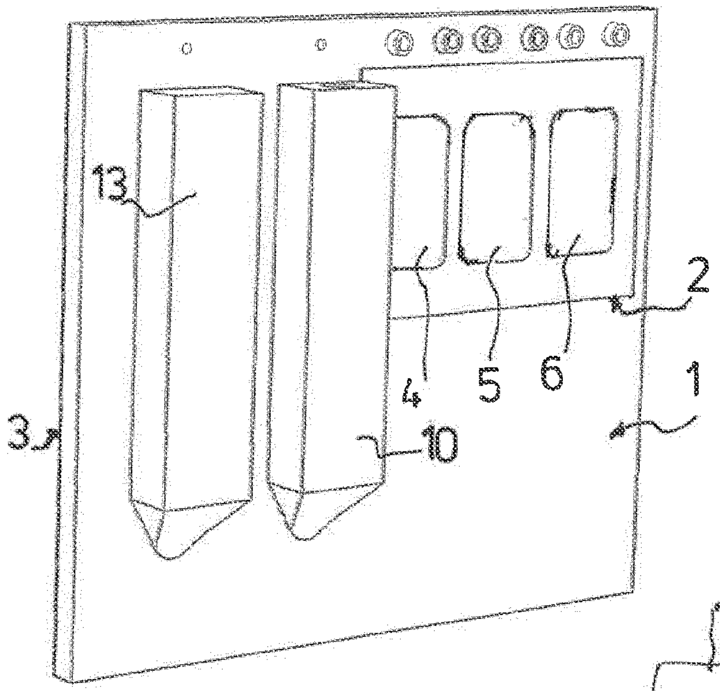
FIG. 1 shows a flow cell having a plurality of fluid transport ducts according to the invention, in a front view.

A microfluidic flow cell, shown in FIG. 1, which is connectable to an operating apparatus (not shown) comprises a substantially plate-shaped substrate 1 which is integrally produced from plastic by the injection-molding method, for example from PP, PE, COC, PC, PMMA, or from a mixture of these plastics.

The substrate, on the side thereof that is visible in FIG. 1, by way of part of its plate area is adhesively bonded or/and welded to a film 2. On that side of the substrate 1 that faces away from the former, the entire plate area is connected to a planar film 3 which covers and shuts off clearances in the substrate 1 that are open toward this plate area.

Thermoformed zones of the film 3 in the example shown form three storage chambers 4, 5, and 6 for receiving reagent liquids. The film 2 is composed of an aluminum-plastics laminate, the aluminum layer thereof that points toward the outside forming a vapor barrier to the reagent liquids in the storage chambers.

The cover film 3 in the example shown is composed of the same plastics material as the substrate 1, or else optionally of an aluminum-plastics laminate.

Figure 2:
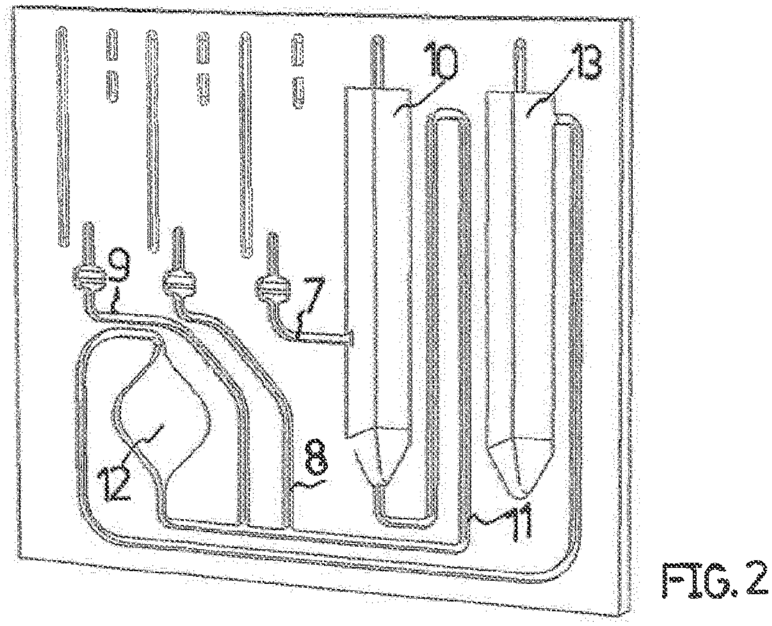
FIG. 2 shows the flow cell of FIG. 1 in a rear view, without a cover film.

As is shown in FIG. 2, the storage chamber 4 by way of a duct 7 is connectable to a chamber 10 for receiving a specimen substance to be examined. The specimen chamber 10 in turn by way of a duct 11 and a reaction or detection zone 12 for examining the specimen substance is connected to a waste chamber 13. The storage chambers 5 and 6 by way of ducts 8 and 9 may be connected to the duct 11.

Figure 3:
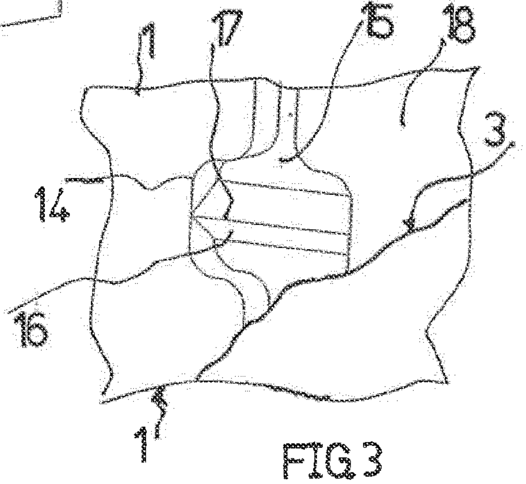
FIG. 3 shows a duct zone of a transport duct of the flow cell of FIG. 1, having a predetermined breaking point, partially without a cover film.

The ducts 7 and 9 each have a widened duct zone 14, separately illustrated in FIG. 3, in which the duct in the flow direction is closed off and an unlockable predetermined breaking point is formed.

A clearance 15 which forms the respective duct zone 14 and is relevant to the size of the duct cross section is traversed by a barrier web 16 that in the example shown has a triangular cross section. A peripheral portion 17 of the barrier web 16 that faces the cover film 3 is flush with the planar plate area 18 of the substrate 1 that is adjacent to the clearance 15, and is connected to the cover film 3. The barrier web 16 that is integrally connected to the substrate 1 in this way completely blocks the respective duct.

The cover film 3, which is adhesively connected or/and welded to the substrate 1, in the zone of the peripheral portion 17 is also connected to the barrier web 16, wherein this connection forms a rupturable predetermined breaking point. In the case of a prevalent fluid pressure that may be generated by compressing a thermoformed zone of the film 2 and by squeezing the respective storage chamber 4, 5, or 6, the connection between the barrier web 16 and the cover film 3 is ruptured, while deflecting the cover film 3.

The peripheral portion 17 of the barrier web 16 forms a connection zone that in terms of the dimensions thereof is defined and that enables a reproducible closure strength and thus reliable rupturing of the predetermined breaking point at a specific fluid pressure. The length of the peripheral portion 17 is preferably <0.5 mm, in particular <0.1 mm, optionally even <0.05 mm.

In the example shown, the film 3 is adhesively bonded or/and welded to the barrier web 16. Additionally or alternatively, a clamping connection between barrier web 16 and cover film 3 is also to be considered, as is discussed further below.

For the sake of simplicity, further details of the flow cell shown in FIGS. 1 and 2 are not described herein. It is to be understood that a flow cell having a duct of the type as is included in a plurality thereof in the flow cell of FIGS. 1 and 2 may also be constructed in a manner entirely different from that of the flow cell shown in FIGS. 1 and 2, and in the extreme case may, for example, have a duct of this type only as a singular functional part.

Figure 4:
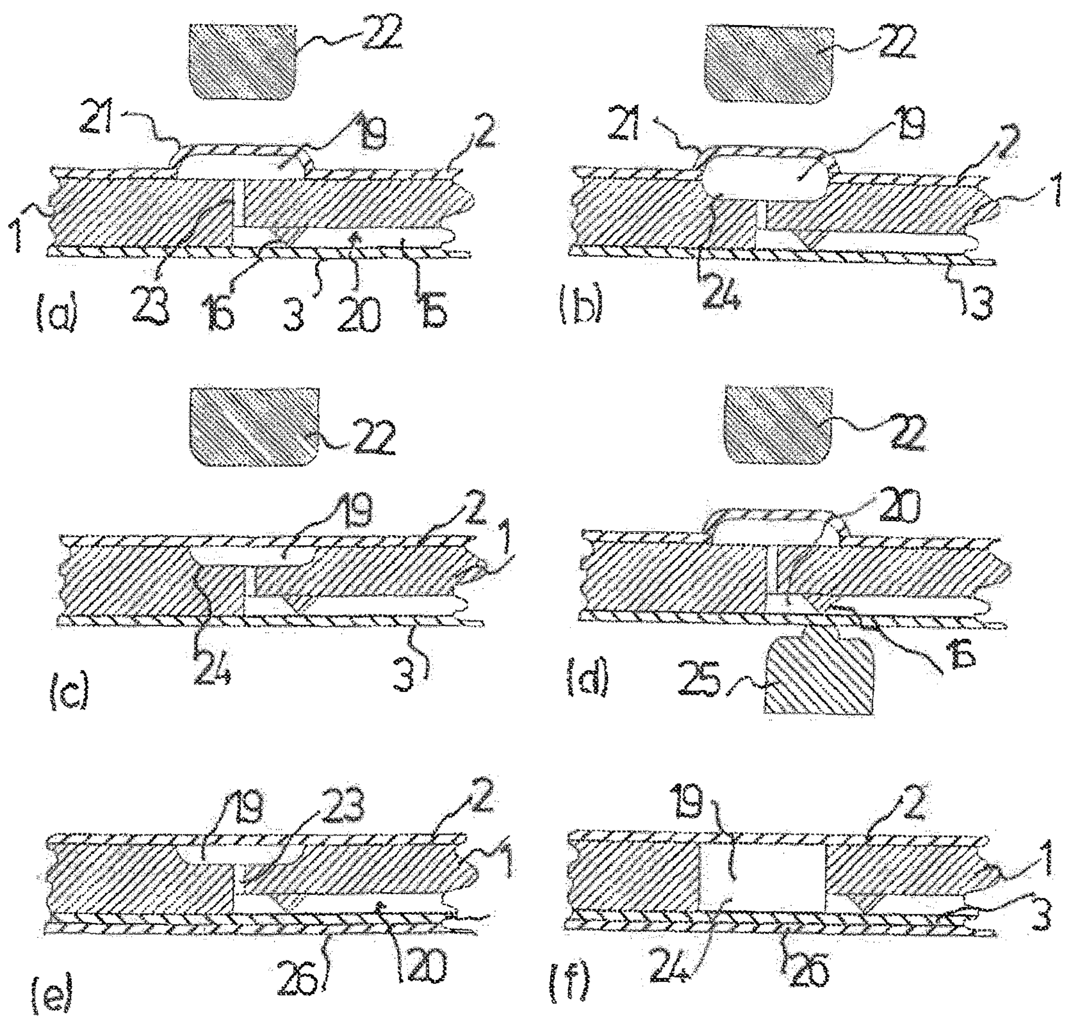
FIG. 4 shows various exemplary embodiments of a fluid storage unit that is usable in a flow cell, having a transport duct according to the invention that is connected to the fluid storage unit.

FIG. 4 in fragments shows flow cells having a storage chamber 19 and a duct 20 having a predetermined breaking point on a barrier web 16. The storage chamber 19 is delimited by a film 2 which is adhesively bonded or/and welded to a plate-shaped substrate 1 on one side of the latter. A cover film 3 that is adhesively bonded or/and welded to the plate-shaped substrate 1 on the other side of the latter, while delimiting the duct 20, shuts off a duct clearance 15 in the substrate 1 that is connected to the storage chamber 19.

According to FIG. 4A, an actuator ram 22, acting on a thermoformed zone 21 of the film 2 that forms the storage chamber 19, of an operating apparatus (not shown in more detail) in terms of the dimensions of said actuator ram 22 is configured so as to be narrower than the thermoformed zone 21, such that the latter laterally buckles in a defined manner when fluid is squeezed out of the storage chamber 19, thus enabling a controlled buildup of pressure for opening the predetermined breaking point.

In a projection that is perpendicular to the plate plane of the substrate 1, the barrier web 16 is located in the duct 20 within the projected zone of the storage chamber 19. The storage unit and the predetermined breaking point may thus be accommodated in a space-saving manner in a narrow zone of the flow cell.

In the case of the exemplary embodiment of FIG. 4*b*, a storage chamber 19 between a film 2 and a substrate 1 is not formed by a thermoformed zone 21 of the film 2 alone, but also by a clearance 24 in the substrate. The clearance 24 and the geometry of the actuator ram 22 are chosen such that complete emptying of the storage zone is possible in that the film 21 in the terminal position of the actuator ram 22 is deformed such that said film 21 largely bears on the contour of the clearance 24. For this purpose, the contour of the actuator ram 22 in relation to the contour of the clearance 24 is recessed by a factor corresponding to double the thickness of the film 2.

According to the exemplary embodiment of FIG. 4*c*, such a clearance 24 in the substrate 1 is singularly relevant to the volume of a storage chamber 19.

The exemplary embodiment of FIG. 4*d* corresponds to the exemplary embodiment of FIG. 4*a*. A movable element 25 may be retained manually or by an operating apparatus in a closure position, or said movable element 25 is fixedly yet releasably connected by means not shown, such as by undercuts or snap-fit closures, to the substrate 1 such that the predetermined breaking point on the barrier web 16 is impossible to be forced open by a buildup of pressure in the duct 20 with the aid of an actuator ram 22. The predetermined breaking point may only be ruptured in a position in which the element 25 is retracted from the retaining position shown in FIG. 4*d*. The element 25 may be retracted manually or by the operating apparatus. When the movable element 25 is used, adhesive bonding or welding of the predetermined breaking point may be dispensed with. By retracting the element 25, the force required for unlocking the predetermined breaking point is reduced by the amount that would be necessary for rupturing a welded or adhesively bonded connection.

The exemplary embodiment of FIG. 4*e* corresponds to the exemplary embodiment of FIG. 4*c*, except for a further film 26 which forms a vapor barrier to fluid that reaches the duct 20 from the storage unit 19. The film 26 is composed of aluminum, for example, and has an integrated adhesive layer that is sensitive to pressure, for example. Alternatively, the film 26 may be connected to the film 3 only in a localized manner and not in the zone of the predetermined breaking point.

Such a barrier film 26 is advantageous in particular in the case of the exemplary embodiment of FIG. 4*f*, in which a storage chamber 19 is formed by a clearance 24 that continues through a substrate 1, the storage content thus coming into direct contact with the cover film 3. A duct portion 23 that connects the storage chamber 18 to the clearance 15 may be omitted in the case of the exemplary embodiment of FIG. 4*f*.

Figure 5:
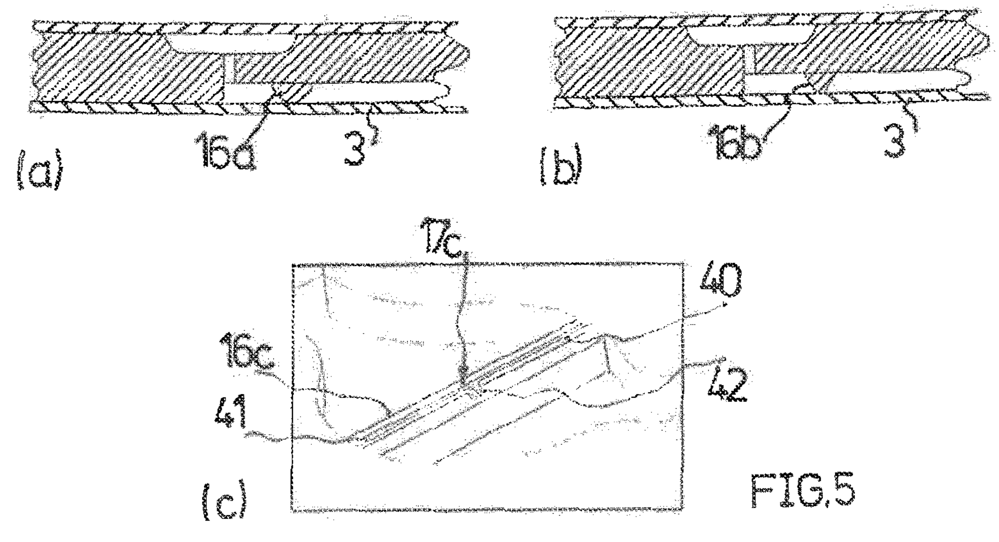
FIG. 5 shows three further exemplary embodiments according to the invention, for configuring predetermined breaking points in transport ducts.

Exemplary embodiments shown in FIG. 5 correspond to the exemplary embodiment of FIG. 4*c*, except for the design of the cross section of a barrier web that forms the predetermined breaking point.

According to FIG. 5*a*, a barrier web 16*a* in the cross section is not configured so as to be triangular but semicircular. In the case of such a cross section, the barrier web also bears on the cover film 3 in a linear manner. Such a barrier web during injection molding of the substrate 1 may advantageously be produced at a lower injection pressure than a barrier web that is triangular in the cross section.

FIG. 5*b* shows a barrier web 16*b* having a flattening that faces the cover film 3. The flattening forms a planar peripheral area of the barrier web 16 that is parallel with the film 3, wherein this peripheral area is congruent with a connection zone between the film 3 and the barrier web 16, the connection zone forming a predetermined breaking point. The front and the rear edge of the flattening, when viewed in the flow direction, delimit the connection zone.

In the case of the exemplary embodiment according to FIG. 5*a* the peripheral area of the barrier web 16 that is parallel with the film 3 is in each case approximated to a line which extends in a transverse manner to the direction of the fluid flow.

FIG. 5*c* shows a barrier web 16*c* having a peripheral portion 17*c* that faces the film 3 (not shown), on which peripheral portion 17*c* a peripheral web 40 that in relation to the remaining barrier web is narrower and that has a correspondingly narrow peripheral area 41 that is parallel with the film 3 is formed. Such a step-shaped barrier web may advantageously be produced at low tooling complexity by the injection-molding method. The peripheral area 41 that is parallel with the film 3, in the longitudinal center of the peripheral web 40, has a bulge 42 that is formed by a protrusion of the peripheral web 40. This bulge 42, projecting counter to the flow direction, during rupturing of the predetermined breaking point forms an initial zone which promotes symmetrical rupturing of the predetermined breaking point from the web center toward the sides, thus contributing toward high reproducibility of the force that is required for rupturing the predetermined breaking point.

Figure 6:
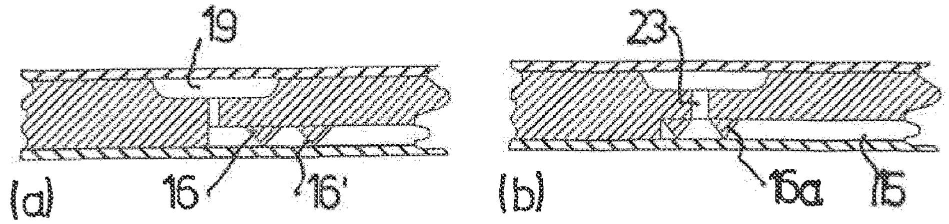
FIG. 6*a* shows a transport duct having two predetermined breaking points.
FIG. 6*b* shows a transport duct having an annular predetermined breaking point.

FIG. 6*a* shows an exemplary embodiment which largely corresponds to FIG. 4*c* but in the case of which two predetermined breaking points instead of only one are formed by two barrier webs 16 and 16'. Particularly tight closure of the storage chamber 19 may be achieved by the two predetermined breaking points. The fluid pressure that is required for rupturing the predetermined breaking point may be dissimilar, that is to say be higher for the second predetermined breaking point at 16' than for the first predetermined breaking point at 16, for example, this being adjustable potentially by way of dissimilar widths of the predetermined breaking points, for example.

FIG. 6*b* shows an exemplary embodiment which is similar to that of FIG. 4*c*, in which, deviating from the latter, the opening of a duct portion 23 that connects the storage chamber 19 to the clearance 15 is surrounded by an annular barrier web 16*a*. The annular barrier web 16*a* may be configured as an entire ring or as a segment of an entire ring.

Figure 7:
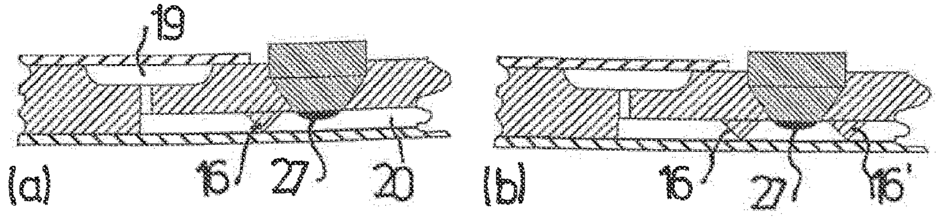
FIG. 7 shows transport ducts according to the invention, having a drying reagent that is disposed so as to be adjacent to the former.

FIG. 7 shows exemplary embodiments in which a drying reagent 27 is disposed downstream in a duct 20 of a predetermined breaking point. This drying reagent may advantageously be suitably re-dissolved by way of a liquidizing reagent that is retrieved from a storage chamber 19. Prior to the predetermined breaking point being opened, the drying reagent is expediently isolated from the storage chamber 19.

In the case of the exemplary embodiment of FIG. 7*b*, a predetermined breaking point, which is formed by a further barrier web 16', is yet again disposed downstream of the drying reagent. On account thereof, environmental influences are kept away even more effectively from the drying reagent during storage.

Figure 8:
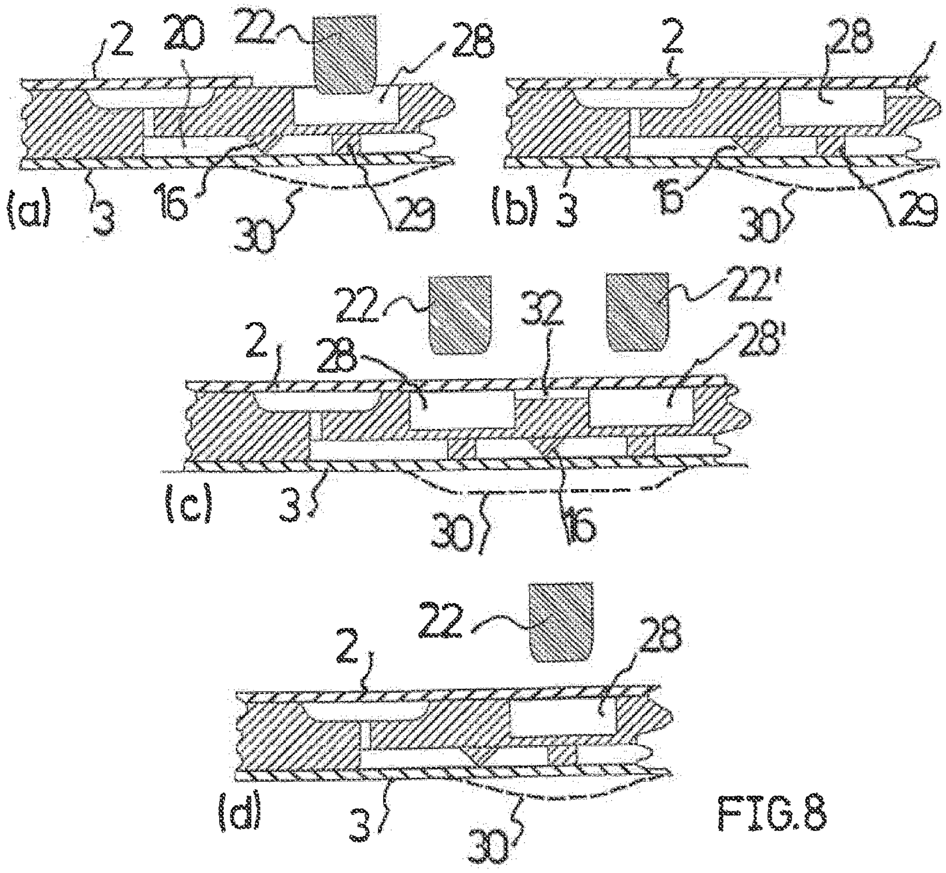
FIG. 8 shows transport ducts having predetermined breaking points which may be ruptured by external actuators.

FIG. 8 in fragments shows exemplary embodiments of flow cells, in which separate installations for rupturing a predetermined breaking point that is formed by a barrier web 16 are provided.

In the case of the exemplary embodiment of FIG. 8*a*, a weak spot is formed in a substrate 1 by way of a clearance 28 in such a manner that a cover film 3 by way of a protrusion 29 according to the dashed line 30 may be deflected with the aid of an actuator ram 22, and the predetermined breaking point which is formed at 16 may be ruptured, or in the case of an opened predetermined breaking point the throughflow cross section of the duct 20 may be enlarged, respectively. In particular, emptying of the storage unit 19 may be performed at low pressure by way of this separate opening action of the predetermined breaking point. Moreover, the flow resistance of the predetermined breaking point may advantageously be regulated when the latter is opened.

In the case of the exemplary embodiment of FIG. 8*b*, an inlet duct 31 for a pressurized gas that deforms the substrate in a corresponding manner is formed instead of a mechanical actuator ram 22.

In the case of the exemplary embodiment of FIG. 8*c*, two weak spots for deflecting a film 3 are provided so as to be disposed ahead and behind a predetermined breaking point, when viewed in the flow direction, wherein clearances 28 and 28' that form weak spots are interconnected by way of a duct 32. A film 2 may be dented by actuator ram 22 and 22' such that a gas pressure that deforms the substrate 1 and deflects the film 3 according to the dashed line 30 is created in the clearances 28, 28'.

The exemplary embodiment of FIG. 8*d*, having only one clearance 28 and one actuator ram 22, operates based on the same principle.

Figure 9:
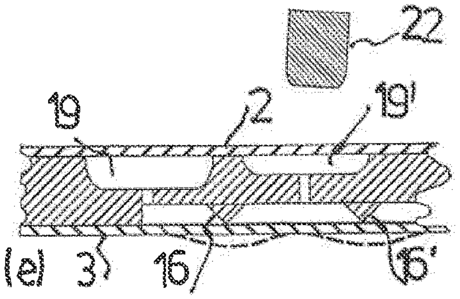
FIG. 9 shows a transport duct according to the invention that is connected to two storage chambers.

FIG. 9 shows an exemplary embodiment having a storage chamber 19 and a further storage chamber 19'. A deformation of a film 2 by way of an actuator ram 22 leads to a buildup of pressure in the chamber 19' and thus to two predetermined breaking points that are formed by barrier webs 16 and 16' being opened. The transport of reagent from the storage chamber 19 thereafter, by virtue of the already opened predetermined breaking points, may be performed in a more controlled manner and at lower pressure.

Figure 10:
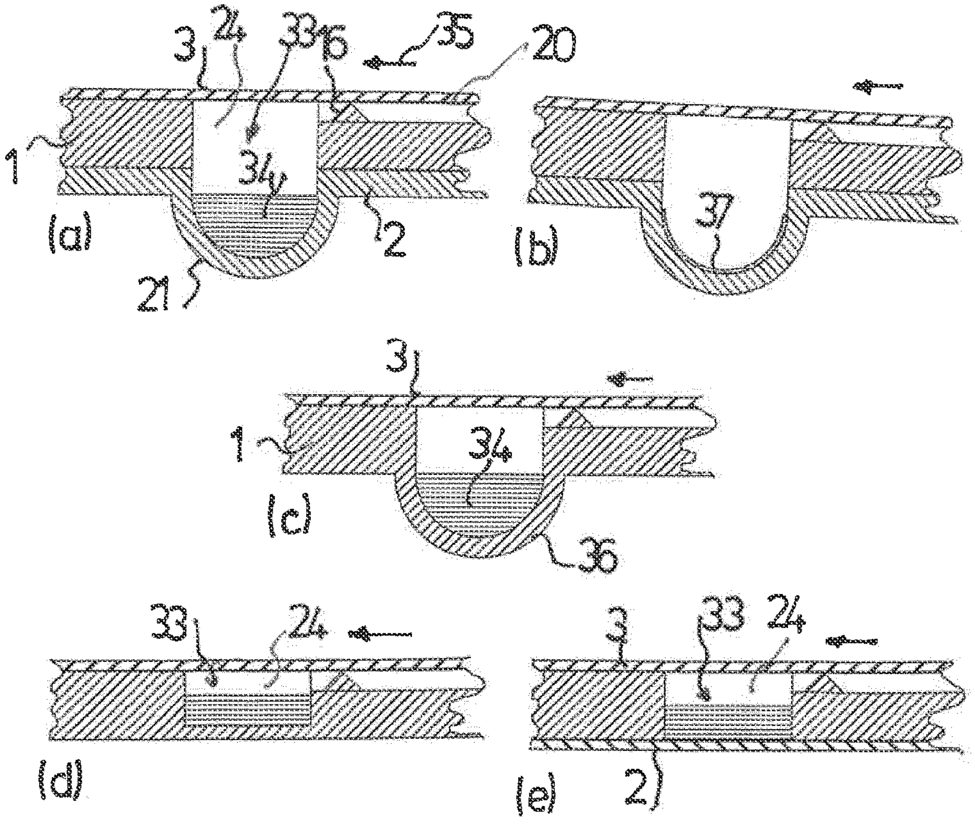
FIG. 10 shows transport ducts according to the invention, for filling a storage space of a flow cell.

FIG. 10 in fragments shows flow cells having a storage chamber 33 that is only partially filled with a fluid 34, the former being isolated by way of a barrier web 16 that forms a predetermined breaking point. The storage chamber 33 may be filled with a further fluid, for example a fluid to be analyzed, by way of a duct 20. In the case of a pressure buildup by an inflowing fluid as indicated according to the arrow 35, a predetermined breaking point that is formed on the barrier web 16 is ruptured. In the case of a further pressure buildup, the gas of the air-filled or gas-filled part-zone of the storage space 33 is initially compressed, the fluid reaching the storage space where said fluid may mix and optionally react with the fluid 34 that is stored in said storage space. After filling, a drop in pressure leads to the compressed air escaping in the direction that is counter to the arrow 35. This may be simultaneously performed by a plurality of storage zones 33 if and when the adjacent duct zones 20 thereof are connected to a pressure source and to a fluid source. After filling and the buildup of pressure, the fluid mix is prevented from flowing back by the barrier web 16.

The volume of the storage chamber 33 is in part formed by a continuous clearance 24 in a substrate 1, and furthermore by a thermoformed zone 21 of a film 2 which may be composed of an aluminum-plastics laminate or only of plastics, and may be produced by injection-molding.

The storage chamber 33 in the case of the exemplary embodiment of FIG. 10*b* contains a drying reagent 37.

The exemplary embodiment of FIG. 10*c* differs from the exemplary embodiment of FIG. 10*a* in that the storage volume of the storage chamber 33 is formed exclusively by a substrate 1 having a bulge 36.

Such a bulge is absent in the case of the exemplary embodiment of FIG. 10*d*. A clearance 24 in the plate-shaped substrate 1 which is open on one side is exclusively relevant to the volume of the storage chamber 33.

In the case of the exemplary embodiment of FIG. 10*e*, the clearance 24 is continuous, and is covered on both sides by a film 2 or 3, respectively.

Figure 11:
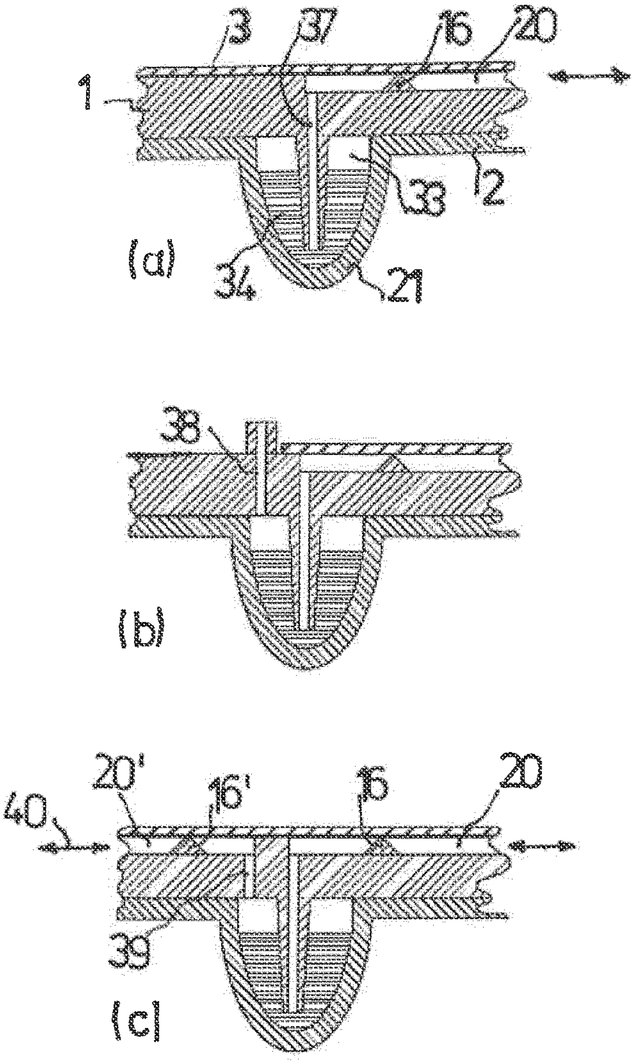
FIG. 11 shows storage units which are provided to be partially filled by transport ducts according to the invention.

In the case of an exemplary embodiment shown in FIG. 11, a storage chamber 33 is partially filled with a fluid 34. A pipeline 37 which is submerged in the fluid 34 protrudes into the storage chamber 33. The pipeline 37 is connected to a duct 20 that is closed off by a barrier web 16.

After a predetermined breaking point that is formed on the barrier web 16 has ruptured, a specimen fluid to be examined by way of the duct 20 and the pipeline 37 may be directed into the storage chamber 33 where the specimen fluid comes into contact with a fluid 34 that forms a reagent.

A conveying pressure that bears on the specimen fluid in order for the predetermined breaking point to be ruptured, after opening the latter, ensures that the air that when viewed in the flow direction is located behind the barrier web 16 in the duct 20 and the pipeline 37 is displaced, said air rising in the fluid 34. Specimen fluid that finally enters the storage chamber 33, due to a compression of the air above the fluid level of the fluid 34, ensures a buildup of pressure in the storage chamber 33.

In the case of the conveying pressure being reduced, a mixture of the specimen fluid and of the reagent fluid 34 therefore flows back into the pipeline 37 and optionally into the duct 20. By way of alternatingly increasing and lowering the conveying pressure the mixture may be moved accordingly and be further homogenized by the movement.

By way of further lowering the conveying pressure, the mixture by way of the pipeline 37 and of the duct 20 may finally be discharged to a part of the flow cell that further processes said mixture, or the latter for the purpose of analysis, for example a visual analysis, remains in the storage chamber 33.

The same construction of a storage chamber may also be used for re-suspending a drying reagent such as the drying reagent 37 of FIG. 10*b* that is provided in the storage chamber.

The construction according to FIG. 11 may also be utilized merely for emptying the storage chamber 33, in that pressurized gas is infed by way of the duct 20 and is compressed above the fluid level in the storage-chamber zone. The pressurized gas may subsequently force the fluid 34 out of the storage chamber 33 for evacuation into the pipeline 37 and into the duct 20.

A film 21 that forms the storage unit may be configured so as to be elastically deformable such that the volume of the storage chamber 33 may be enlarged by the conveying pressure such that comparatively large specimen amounts may be processed. Furthermore, the buildup of pressure in the storage chamber 33 is reduced by way of the enlargement of the volume.

The exemplary embodiment of FIG. 10*b* differs from the exemplary embodiment of FIG. 10*a* in that there is a filling duct 38 that opens into the storage chamber 33, through which filling duct 38 a reagent may be filled into the storage chamber, for example by means of manual or automatic pipetting, or by means of a needle that penetrates the filling duct. It is to be understood that air that is displaced during this procedure must be able to escape from the storage chamber 33. After filling, the filling duct 38 may be sealed by welding, adhesive bonding, or/and by means of a closure plug.

In the case of an exemplary embodiment that is illustrated in FIG. 11*c*, a second duct 20' having a barrier web 16' is provided. The duct 20' is connected to the storage chamber 33 by way of a passage 39 which opens out above the fluid level of the fluid 34.

Once predetermined breaking points that are provided on the barrier webs 16, 16' have been ruptured, a specimen fluid may be infed by way of the duct 20 and of the pipeline 37, wherein displaced air may escape through the passage 39 and the duct 20'. By way of pressurized gas that comes to bear on the fluid level in the storage chamber 33 by way of the duct 20, a mixture of specimen fluid and reagent that has been formed may be removed almost without residue from the storage chamber 33 by way of the pipeline 37 and the duct 20.

The plastics coating of the films 2 that are formed from an aluminum-plastics laminate, as in the flow cells described above, is preferably composed of the same plastics material as is the respective substrate 1.

The fluid in the storage chambers described above, instead of being a liquid, may also be merely air or another pressurized gas that is usable for transporting fluid in the flow cell.

The substrate, in particular on that side thereof that faces the film 2, is expediently provided with a surface structure, for example with trenches, that facilitates the connection to the film 2, 3. The trenches may encircle the storage zone, in particular. Preferred cross-sectional dimensions of the trenches are 0.1×0.1 mm2 to 1×1 mm2. One to three trenches are advantageously formed. During adhesive bonding or welding, the adhesive or the fused plastics layer of the film 2 may penetrate the trenches and engage therein, this improving the adhesion of the film to the substrate 1.

In order for the cover film 3 to be connected to the substrate, in particular laser welding or thermal bonding may be considered, even bonding facilitated by solvents. Using this method, connection zones of the predetermined breaking points that have constant dimensions and constant strength may be achieved.

I claim:

1. A flow cell, comprising: an elongate storage chamber that is partially filled with a liquid fluid up to a fluid level and in which a pressurizable gas is enclosed above the fluid level directly bordering the gas; a lower duct that connects a lower end of the storage chamber to a chamber for receiving a specimen substance to be examined; an upper duct at an upper end of the elongate storage chamber; a barrier web that closes off the lower duct and the storage chamber, wherein the lower duct and the barrier web are arranged below the fluid level, wherein the barrier web has a predetermined breaking point formed by a material-locking connection that is; a film connected to the substrate so as to form the storage chamber and the ducts, wherein the breaking point is a material-locking connection that is irreversibly ruptured when the film is deflected; and a substantially plate-shaped substrate, wherein the storage chamber and the ducts are arranged in the substrate so that when the substrate is oriented vertically the liquid in the storage space escapes by gravity from the lower duct and a pressure is introducible from the upper duct so as to assist a flow of liquid, wherein the storage chamber has a stiff, inflexible wall so that positive and negative pressure is introduced to bull by external sources to facilitate the flow of the liquid.

2. The flow cell according to claim 1, wherein the duct is arranged so that after rupture of the predetermined breaking point a further fluid or a compressed gas is introducible into the storage chamber by compressing the pressurized gas enclosed above the fluid level.

3. The flow cell according to claim 2, wherein the fluid is a reagent and the further fluid is a specimen fluid.

4. The flow cell according to claim 1, further comprising: a further duct closed by a further barrier web; and a passage that opens into the storage chamber above fluid level of the fluid and is connected to the further duct.

5. The flow cell according to claim 4, wherein the further duct is configured to apply a compressed gas.

6. The fuel cell according to claim 1, further comprising a filling duct that opens into the storage chamber, the filling duct being closable after filling of the storage chamber.

7. The flow cell according to claim 1, wherein the film is elastically deformable.

* * * * *